A. E. RUD.
NUT LOCK.
APPLICATION FILED JUNE 25, 1914.

1,167,784. Patented Jan. 11, 1916.

Witnesses
Inventor
A. E. Rud

UNITED STATES PATENT OFFICE.

ALBIN E. RUD, OF CLAIRE CITY, SOUTH DAKOTA.

NUT-LOCK.

1,167,784.   Specification of Letters Patent.   Patented Jan. 11, 1916.

Application filed June 25, 1914. Serial No. 847,252.

*To all whom it may concern:*

Be it known that I, ALBIN E. RUD, a citizen of the United States, residing at Claire City, in the county of Roberts, State of South Dakota, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks.

The principal object of the invention is to provide a simple and novel device which will effectively prevent loosening or removal of a nut from the bolt.

Another object is to provide a locking means which cannot become accidentally disengaged.

Other objects and advantages will be apparent from the following description, when taken in connection with the accompanying drawings.

Figure 1:
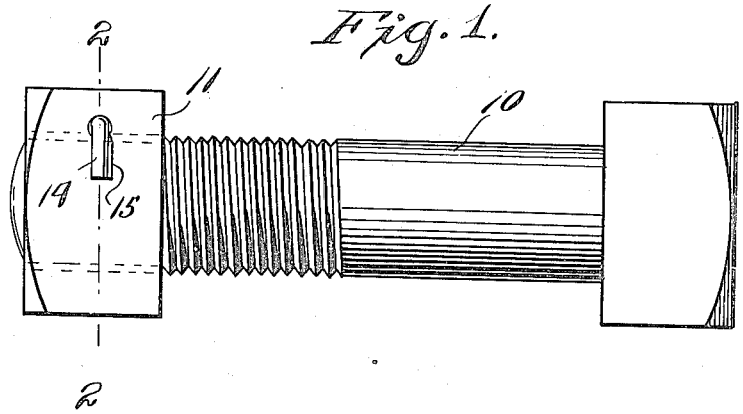
Figure 2:
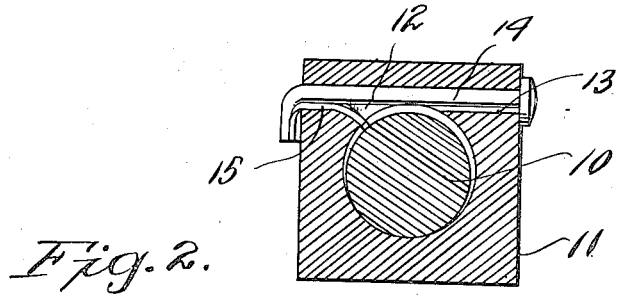
Figure 3:
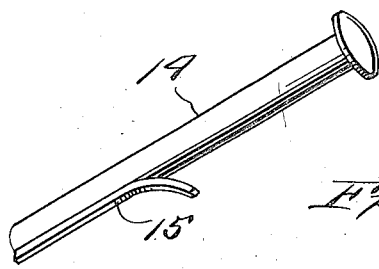

In the drawings, Figure 1 is a plan view of a nut and bolt having my invention applied thereto. Fig. 2 is a vertical section on the line 2—2 of Fig. 1. Fig. 3 is a perspective view of the locking pin removed.

Referring particularly to the accompanying drawings, 10 represents a bolt on which is engaged the nut 11. In one side of the wall of the central opening of the nut is formed a recess 12 and formed transversely through the nut and tangentially with the opening is a bore 13. Disposed through this bore is a pin 14 on the underside of which is secured a spring finger 15, the forward end of which is provided with a sharpened point as shown. This pin is arranged to be driven through the bore 14 so that the pointed end of the finger 15 is moved downwardly into the recess 12 and bites into the threads of the bolt. The other end of the pin, which projects from the opposite side of the nut being bent down against the nut. Thus the spring finger locks the nut against retrograde rotation, and the turned down end of the pin prevents accidental displacement of the pin tending to disengage the spring finger from the bolt.

What is claimed is:

In a nut lock, the combination with a nut and bolt, the nut having a recess formed in the wall of the central opening thereof, said nut also having a bore formed transversely therethrough and tangentially with the central opening, a pin disposed longitudinally in the bore and having a head engaging the face of the nut at one end of the bore, a spring finger secured to the other end of the pin and having a sharpened free end extending inwardly into the recess and having biting engagement with the threads of the bolt, the said other end of the pin being bent against the face of the nut at the remaining end of the bore.

In testimony whereof, I affix my signature, in the presence of two witnesses.

ALBIN E. RUD.

Witnesses:
 JOHN GUMO,
 CARL J. RUD.